United States Patent
Leimgruber et al.

[15] 3,678,051

[45] July 18, 1972

[54] DERIVATIVES OF 1,6-PHENAZINEDIOL 5,10-DIOXIDE

[72] Inventors: Willy Leimgruber, Montclair; Manfred Weigele, North Caldwell, both of N.J.

[73] Assignee: Hoffman-La Roche Inc., Nutley, N.J.

[22] Filed: April 2, 1970

[21] Appl. No.: 25,297

[52] U.S. Cl. ..................260/267, 260/247.5 R, 424/248, 424/250
[51] Int. Cl. ..........................................C07d 51/80
[58] Field of Search......................260/247.5, 267

[56] References Cited

UNITED STATES PATENTS 3,567,728   3/1971   Johnston et al.........................260/267

*Primary Examiner*—Nicholas S. Rizzo
*Assistant Examiner*—Anne Marie T. Tighe
*Attorney*—Samuel L. Welt, Jon S. Saxe, Bernard S. Leon, Gerald S. Rosen and R. Hain Swope

[57] ABSTRACT

6-Substituted derivatives of 1-phenazinol 5,10-dioxide which possess broad spectrum anti-microbial activity are disclosed.

9 Claims, No Drawings

DERIVATIVES OF 1,6-PHENAZINEDIOL 5,10-DIOXIDE

DESCRIPTION OF THE INVENTION

This invention relates to novel derivatives of 6-substituted derivatives of 1-phenazional 5,10-dioxide and to methods for their preparation. More particularly, this invention relates to derivatives of 1,6-phenazinediol 5,10-dioxide, the known antibiotic iodinin, which are prepared by mono-alkylation of one of the two hydroxyl groups of the molecule. These novel derivatives exhibit broad spectrum anti-microbial activity and have the added advantage over the parent antibiotic of possessing better solubility properties.

The novel derivatives to which the invention relates are selected from the group consisting of compounds represented by the formula

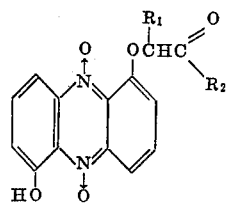

I wherein $R_1$ signifies hydrogen or lower alkyl; and $R_2$ signifies hydroxy, lower alkoxy, amino, mono-lower alkylamino, di-lower alkylamino, hydroxy-lower alkylamino, [di-lower alkylamino-lower alkyl]amino or Z wherein Z signifies a 5 or 6 membered saturated heterocyclic ring containing a nitrogen atom and at most one further hetero atom consisting of oxygen.

As used herein, the term "lower alkyl" either alone or in combination denotes straight or branched chain saturated hydrocarbon groups containing from one to seven carbon atoms inclusive, such as methyl, ethyl, propyl, isopropyl, butyl, pentyl, hexyl and the like, with groups containing from one to four carbon atoms being preferred. The term "lower alkoxy" designates straight or branched chain alkoxy groups containing from one to seven carbon atoms, preferably from one to four carbon atoms, such as methoxy, ethoxy, propoxy and the like.

In a preferred aspect, when R signifies Z, S being defined as above, the heterocyclic ring is saturated and represents a member selected from the group consisting of morpholino, piperidino, and pyrrolidino.

Representative of the compounds of formula I are:
6-hydroxy-1-phenazinoxyacetic acid 5,10-dioxide ethyl ester
6-hydroxy-1-phenazinoxyacetic acid 5,10-dioxide
6-hydroxy-α-methyl-1-phenazinoxyacetic acid 5,10-dioxide ethyl ester
6-hydroxy-α-methyl-1-phenazinoxyacetic acid 5,10-dioxide
6-hydroxy-α-ethyl-1-phenazinoxyacetic acid 5,10-dioxide ethyl ester
6-hydroxy-α-ethyl-1-phenazinoxyacetic acid 5,10-dioxide
6-pyrrolidinylcarbonylmethoxy-1-phenazional 5,10-dioxide
6-hydroxy-N-(2-hydroxyethyl)-1-phenazinoxyacetamide 5,10-dioxide
6-hydroxy-N-methyl-1-phenazinoxyacetamide 5,10-dioxide
6-hydroxy-N-(3-dimethylaminopropyl)-1-phenazinoxyacetamide 5,10-dioxide
6-hydroxy-1-phenazinoxyacetamide 5,10-dioxide A preferred class of compounds falling within the scope of formula I are those wherein $R_2$ signifies hydroxy or lower alkoxy, i.e., compounds of the formula

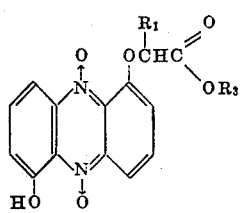

Ia wherein $R_1$ is as described above and $R_3$ signifies hydrogen or lower alkyl.
The compounds of formula Ia above are preferred because of their interesting level of biological activity.

Another class of compounds preferred because of their interesting biological activity and falling within the scope of the present invention are those wherein $R_1$ signifies hydrogen and $R_2$ signifies amino, mono-lower alkylamino or di-lower alkylamino, i.e., compounds of the formula

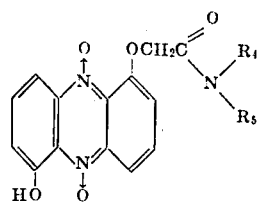

Ib wherein $R_4$ and $R_5$ each independently signify hydrogen or lower alkyl. Most preferred of the compounds of formula I are:
6-hydroxy-1-phenazinoxyacetic acid 5,10-dioxide ethyl ester
6-hydroxy-1-phenazinoxyacetic acid 5,10-dioxide
6-hydroxy-α-methyl-1-phenazinoxyacetic acid 5,10-dioxide ethyl ester
6-hydroxy-α-methyl-1-phenazinoxyacetic acid 5,10-dioxide
6-hydroxy-1-phenazinoxyacetamide 5,10-dioxide
6-hydroxy-N-(3-dimethylaminopropyl)-1-phenazinoxyacetamide 5,10-dioxide The compounds of formula I above maybe prepared following a variety of procedures. The choice of procedures will depend upon the nature of the $R_1$ and $R_2$ substituents to be introduced into the phenazinol molecule.

For example, the compounds of formula I wherein $R_2$ signifies a lower alkoxy group can be prepared using conventional alkylating techniques. This alkylation procedure, which results in the preparation of the ester derivatives, is preferably carried out in two stages. In the first stage, the known compound 1,6-phenazinediol 5,10-dioxide (iodinin), which is used as the starting material is converted to its mono-alkali metal salt, preferably the potassium salt. The conversion of iodinin to its alkali metal salt is accomplished by reacting iodinin with an alkali metal base. This reaction is expediently effected in the presence of an aprotic polar organic solvent, such as hexamethylphosphoric triamide (HMPT), dimethylformamide (DMF) and dimethylsulfoxide (DMSO), with HMPT being preferred. Use of an aprotic polar organic solvent is preferred since this solvent can also be utilized in the alkylation step, thus eliminating the necessity of first isolating the iodinin salt. Suitable alkali metal bases that may be used to form the iodinin salt include alkali metal lower alkoxides containing from one to four carbon atoms. Preferred alkali metal lower alkoxides include the sodium and potassium compounds, with potassium t-butoxide being the most preferred alkali metal lower alkoxide.

In the second stage of the alkylation process, the monoalkali metal salt of iodinin is selectively alkylated by reacting said salt with the corresponding α-halo ester. Suitable α-halo esters for this purpose include ethyl bromo acetate, ethyl α-bromopropionate, ethyl α-bromo-n-butyrate and the like. As indicated above, this selective alkylation of the mono-alkali metal salt of iodinin is expediently effected in the presence of an aprotic polar organic solvent such as HMPT, DMF and DMSO, with HMPT being preferred. The alkylation reaction conditions can be varied. However, for convenience and optimum yields suitable conditions include the use of temperatures between about 10° and about 70° C and reaction times sufficient to complete the reaction, usually from about 1 to about 24 hours. In a preferred aspect, the alkylation reaction is effected at room temperature.

In a further process aspect of the present invention, the novel compounds of formula I wherein the $R_2$ substituent is hydroxy may be prepared by the hydrolysis of the corresponding compounds of formula I wherein $R_2$ signifies lower alkoxy, i.e., by hydrolysis of the corresponding ester derivatives. This hydrolysis is effected by treating the ester compound with an aqueous base. Suitable bases for this purpose include alkali metal hydroxides such as sodium hydroxide, potassium hydroxide and the like; and alkali metal carbonates such as sodium carbonate, sodium bicarbonate and the like; with sodium hydroxide being the most preferred base. This reaction is expediently effected in the presence of an aprotic polar organic solvent such as HMPT, DMF and DMSO, with HMPT being preferred. Temperature and reaction time are not critical to this process aspect. Therefore, temperatures in the range of from about 10° to about 70° C are suitable, with room temperature being preferable. Likewise, reaction times sufficient to permit completion of the reaction are employed, usually from about 1 to about 24 hours.

In a further process aspect of the present invention, the novel compounds of formula I wherein the $R_2$ substituent is an amino group or a primary or secondary amine may be prepared by treating the ester derivative with ammonia or the corresponding aliphatic or saturated cyclic amine. Representative amines that may be used in this process aspect include monomethylamine, diethylamine, ethanolamine, 3-dimethylamino-propylamine, pyrrolidine, morpholine, piperidine and the like. Temperature and reaction time are not critical to this process aspect. Thus, temperatures between 10° and 70° C are suitable, with room temperature being preferred. Likewise, reaction times which permit completion of the reaction are employed, usually from about 1 to about 24 hours.

The novel compounds of formula I have been found to possess broad spectrum antimicrobial activity. In particular, these compounds have demonstrated a high level of activity against a wide variety of bacteria, yeasts and fungi such as *Streptococcus agalactiae, Staphylococcus aureus, Escherichia coli, Pseudomonas aeruginosa, Moraxella bovis, Candida albicans,* and *Microsporum canis*. The novel compounds of this invention are particularly useful in the treatment of animal diseases of microbial origin. When the novel compounds of formula I are employed in the treatment of microbial infections, they are conveniently utilized in combination with suitable pharmaceutical carrier materials. These compositions are formulated by uniformly distributing the compound of formula I throughout a vehicle that is chemically compatible with the particular compound, non-inhibiting with respect to the active ingredients and essentially non-injurious to the body tissue under the conditions of use. When formulated into compositions suitable for topical administration, the novel compounds of this invention are preferably employed in amounts ranging from about 0.05 percent to about 1.0 percent by weight of the composition. The compounds of this invention when employed in forms suitable for topical administration may be utilized in varied formulations: for example, in solid formulations including finely divided powders and granular materials and liquid formulations including suspensions, concentrations, tinctures, slurries, aerosols, and the like. Further, they may be employed as creams, gels, jellies, ointments, pastes, etc.

The following examples further illustrate the scope of the invention. All temperatures given are in degrees centigrade unless indicated otherwise.

EXAMPLE 1

Preparation of 6-hydroxy-1-phenazinoxyacetic acid 5,10-dioxide ethyl ester 7.32 grams of iodinin, 450 ml of hexamethyl phosphoric triamide (HMPT) and 3.9 grams of potassium tertiary butyl alcoholate were placed in a flask. The reaction mixture was stirred at room temperature for 16 hours and then 6.0 ml of ethyl bromo acetate were added. The stirring was continued at room temperature for 3 hours. The reaction mixture was poured into 2.0 liters of ice water and extracted with 3 × 500 ml of ethyl acetate. The combined ethyl acetate extracts were washed with 500 ml of water and filtered through a medium sintered glass funnel to break the emulsion. The combined ethyl acetate extracts were dried over magnesium sulfate and concentrated in vacuo. The residue was dissolved in $CH_2Cl_2$ and chromatographed over 250 grams of silica gel to yield 6-hydroxy-1-phenazinoxyacetic acid 5,10-dioxide ethyl ester, m.p. 152°(dec.).

EXAMPLE 2

Preparation of 6-hydroxy-1-phenazinoxyacetic acid 5,10-dioxide 10.5 grams of 6-hydroxy-1-phenazinoxyacetic acid 5,10-dioxide ethyl ester, 200 ml of HMPT and 50 ml of 5 percent aqueous sodium hydroxide were placed in a flask and stirred at room temperature for 5 ½ hours. The reaction mixture was poured into 2.0 liters Of ice water and acidified with 10 percent aqueous HCl. The aqueous phase was extracted with $CH_2Cl_2$ several times. The combined organic phases were extracted with 5 percent aqueous sodium bicarbonate (approximately 1.5 liters). The basic extracts were acidified with 10 percent aqueous HCl. The mixture was allowed to stand at room temperature for one-half hour and the solids were then filtered with water. The solids were slurried in approximately 40 ml of acetone, filtered and air-dried to yield dark red crystals of 6-hydroxy-1-phenazinoxyacetic acid 5,10-dioxide, m.p. 185° (dec.).

EXAMPLE 3

Preparation of 6-hydroxy-α-methyl-1-phenazinoxyacetic acid 5,10-dioxide ethyl ester 7.32 grams of iodinin were suspended in 450 ml of HMPT. To this was added with stirring 3.9 grams of potassium tertiary-butyl alcoholate. The stirring was continued over night. Then 6 ml of ethyl-2-bromopropionate were added and the stirring was continued for another 3 hrs. The reaction mixture was then poured into crushed ice/water (1,200 ml). The reaction mixture was then extracted with 3 × 400 ml ethyl acetate, washed with 3 × 200 ml of water, dried over magnesium sulfate and evaporated to dryness. The residue was dissolved in the minimum amount of dichloromethane, filtered and chromatographed over 250 grams of silica gel to yield 6-hydroxy-α-methyl-1-phenazinoxyacetic acid, 5,10-dioxide ethyl ester, m.p. 133° (dec.).

EXAMPLE 4

Preparation of 6-hydroxy-α-methyl-1-phenazinoxyacetic acid 5,10-dioxide 4.13 grams of 6-hydroxy-α-methyl-1-phenazinoxyacetic acid 5,10-dioxide ethyl ester and 80 ml of HMPT were placed in a flask. To this was added 20 ml of aqueous 5 percent sodium hydroxide. The reaction mixture was stirred at room temperature for 5 ½ hours. It was then diluted with approximately 600 ml of water, made slightly acetic with 10 percent aqueous hydrochloric acid and extracted with $CH_2Cl_2$. The organic extracts were extracted with 5 percent aqueous sodium bicarbonate. The bicarbonate extract was acidified with 10 percent aqueous HCl and the solids filtered and washed with water. The desired product was recrystallized from acetone and the solids were filtered to yield red crystals of 6-hydroxy-α-methyl-1-phenazinoxy-acetic acid 5,10-dioxide, m.p. 208°–210°(dec.).

EXAMPLE 5

Preparation of 6-hydroxy-α-ethyl-1-phenazinoxyacetic acid 5,10-dioxide ethyl ester 7.32 grams of iodinin and 450 ml of HMPT were placed in the flask. The reaction mixture was stirred at room temperature for 17 hours and then 6.0 ml of ethyl-α-bromo-n-butyrate were added. Stirring was continued at room temperature for 4 ½ hours. The reaction mixture was diluted with about 1,200 ml of water and extracted with 4 × 400 ml of ethyl acetate. The combined ethyl acetate extracts were washed with 250 ml of water and the entire contents of the separatory funnel were filtered. The filtrate layers were separated and the organic layers washed with 2 × 250 ml of water, dried over magnesium sulfate and concentrated in vacuo. The residue was dissolved in CH$_2$Cl$_2$ and chromatographed over 400 grams of silica gel to yield 6-hydroxy-α-ethyl-1-phenazinoxyacetic acid 5,10-dioxide ethyl ester, m.p. 129° (dec.).

EXAMPLE 6

Preparation of 6-hydroxy-α-ethyl-1-phenazinoxyacetic acid 5,10-dioxide 2.0 grams of 6-hydroxy-α-ethyl-1-phenazinoxyacetic acid 5,10-dioxide ethyl ester, 40 ml of HMPT and 10 ml of 5 percent sodium hydroxide were placed in the flask. The reaction mixture was stirred at room temperature for 5 ½ hours. This was then diluted with 800 ml of ice water. To this was added 20 ml of 10 percent HCl. The precipatate was filtered off and washed on the filter 2 × 50 ml of water and 1 × 30 ml of methanol. The precipatate was recrystallized from acetone/chloroform to yield 6-hydroxy-α-ethyl-1-phenazinoxyacetic acid 5,10-dioxide, m.p. 134°–135°.

EXAMPLE 7

Preparation of 6-pyrrolidinylcarbonylmethoxy-1-phenazinol 5,10-dioxide 1.50 grams of 6-hydroxy-1-phenazinoxyacetic acid 5,10-dioxide ethyl ester and 15 ml of pyrrolidine were placed in a flask. The reaction mixture was stirred at room temperature for 3 hours. The reaction mixture was then diluted with 400 ml of CHCl$_3$ and washed with 4 × 100 ml of 10 percent aqueous HCl. The reaction mixture was then washed once with 5 percent aqueous sodium bicarbonate and once with water, dried over sodium sulfate and concentrated in vacuo. The residue was recrystallized from acetone to yield 6-pyrrolidinylcarbonylmethoxy-1-phenazinol 5,10-dioxide m.p. 147° (dec.).

EXAMPLE 8

Preparation of 6-hydroxy-N-(2-hydroxyethyl)-1-phenazinoxyacetamide 5,10-dioxide 1.5 grams of 6-hydroxy-1-phenazinoxyacetic acid 5,10-dioxide ethyl ester ware suspended in 30 ml of ethanolamine. The mixture was stirred at room temperature for 4 hours and then diluted with 250 ml of chloroform, washed extensively with dilute HCl and then with water. The chloroform solution was dried over sodium sulfate and evaporated to dryness in vacuo. The crystalline residue was slurried in ether and filtered to give 6-hydroxy-N-(2-hydroxy-ethyl)-1-phenazinoxyacetamide 5,10-dioxide, m.p. 152°–155°.

EXAMPLE 9

Preparation of 6-hydroxy-1-phenazinoxyacetamide 5,10-dioxide 3.00 grams of 6-hydroxy-1-phenazinoxyacetic acid 5,10-dioxide ethyl ester were placed in a sealed tube. The tube was cooled in dry ice/acetone and into it was condensed about 50 ml of ammonia. The tube was sealed and allowed to come to room temperature and stand at room temperature over night. The sealed tube was shaken at room temperature for 4 hours, cooled and opened. The open tube was allowed to come to room temperature to let the excess ammonia evaporate. The contents of the tube were slurried with hot CHCl$_3$ repeatedly and the solids were filtered, washed with CHCl$_3$ and finally with ether to yield 6-hydroxy-1-phenazinacetamide 5,10-dioxide, m.p. 175°–178° (dec.).

EXAMPLE 10

Preparation of 6-hydroxy-N-(3-dimethylaminopropyl)-1-phenazinoxyacetamide 5,10-dioxide 500 milligrams of 6-hydroxy-1-phenazinoxyacetic acid 5,10-dioxide ethyl ester and 5.0 ml of 3-dimethylamino propylamine were placed in a flask and stirred at room temperature for 24 hours. The reaction mixture was diluted with CHCl$_3$ and washed with water until the water washes were neutral. The CHCl$_3$ layer was extracted with 10 percent aqueous HCl. The combined acid extracts were made basic with sodium carbonate. The basic mixture was extracted with ethyl acetate. The ethyl acetate extracts were washed with water, dried over sodium sulphate and concentrated in vacuo to dryness. The residue was slurried with ether and the solids were filtered and washed with ether to yield 6-hydroxy-N-(3-dimethylaminopropyl)-1-phenazinoxyacetamide 5,10-dioxide as red crystals, m.p. 144° (dec.).

EXAMPLE 11

Preparation of 6-hydroxy-N-methyl-1-phenazinoxyacetamide 5,10-dioxide 1.0 grams of 6-hydroxy-1-phenazinoxyacetic acid 5,10-dioxide ethyl ester was placed into a sealed tube. The tube was cooled with dry ice/acetone and into it was condensed about 40 ml of monomethylamine. The tube was sealed and allowed to come to room temperature and shaken at room temperature for 1 hour. The sealed tube was cooled and the tube was opened and allowed to come to room temperature to allow the excess monomethylamine to evaporate over night. The residue was dissolved in CHCl$_3$ and washed with water until the water wash was neutral. The CHCl$_3$ solution was dried over sodium sulfate and concentrated in vacuo. The residue was recrystallized from CHCl$_3$/acetone to yield 6-hydroxy-N-methyl-1-phenazinoxyacetamide 5,10-dioxide, m.p. 168° (dec.).

We claim:

1. A compound selected from the group of compounds of the formula

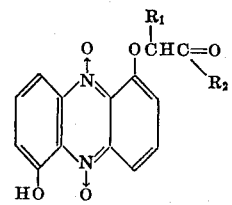

wherein $R_1$ signifies hydrogen or lower alkyl; and $R_2$ signifies hydroxy, lower alkoxy, amino, mono-lower alkylamino, di-lower alkylamino, hydroxy-lower alkylamino, [di-lower alkylamino-lower alkyl]-amino or Z, wherein Z signifies a 5 or 6 membered heterocyclic ring selected from the group consisting of morpholino, piperidino and pyrrolidino.

2. A compound of claim 1 wherein $R_2$ signifies lower alkoxy.

3. A compound of claim 2 wherein $R_1$ signifies hydrogen and the lower alkoxy group is ethoxy, i.e. 6-hydroxy-1-phenazinoxy-acetic acid 5,10-dioxide ethyl ester.

4. The compound of claim 2 wherein $R_1$ signifies methyl and the lower alkoxy group is ethoxy, i.e. 6-hydroxy-α-methyl-1-phenazinoxyacetic acid 5,10-dioxide ethyl ester.

5. A compound of claim 1 wherein $R_2$ signifies hydroxy.

6. The compound of claim 5 wherein $R_1$ signifies hydrogen, i.e. 6-hydroxy-1-phenazinoxyacetic acid 5,10-dioxide.

7. The compound of claim 5 wherein $R_1$ signifies methyl, i.e. 6-hydroxy-α-methyl-1-phenazinoxyacetic acid 5,10-dioxide.

8. The compound of claim 1 wherein $R_1$ signifies hydrogen and $R_2$ signifies amino, i.e. 6-hydroxy-1-phenazinoxyacetamide 5,10-dioxide.

9. The compound of claim 1 wherein $R_1$ signifies hydrogen and $R_2$ signifies 3-dimethylaminopropyl, i.e. 6-hydroxy-N-(3-dimethyl-aminopropyl)-1-phenazinoxyacetamide 5,10-dioxide.

* * * * *

UNITED STATES PATENT AND TRADEMARK OFFICE
CERTIFICATE OF CORRECTION

PATENT NO. : 3,678,051
DATED : July 18, 1972
INVENTOR(S) : Willy Leimgruber and Manfred Weigele It is certified that error appears in the above-identified patent and that said Letters Patent are hereby corrected as shown below:

Example 5, line 21 after "HMPT", please insert -and 3.9 grams of potassium tertiary butyl alcoholate-.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*